United States Patent Office 2,779,802
Patented Jan. 29, 1957

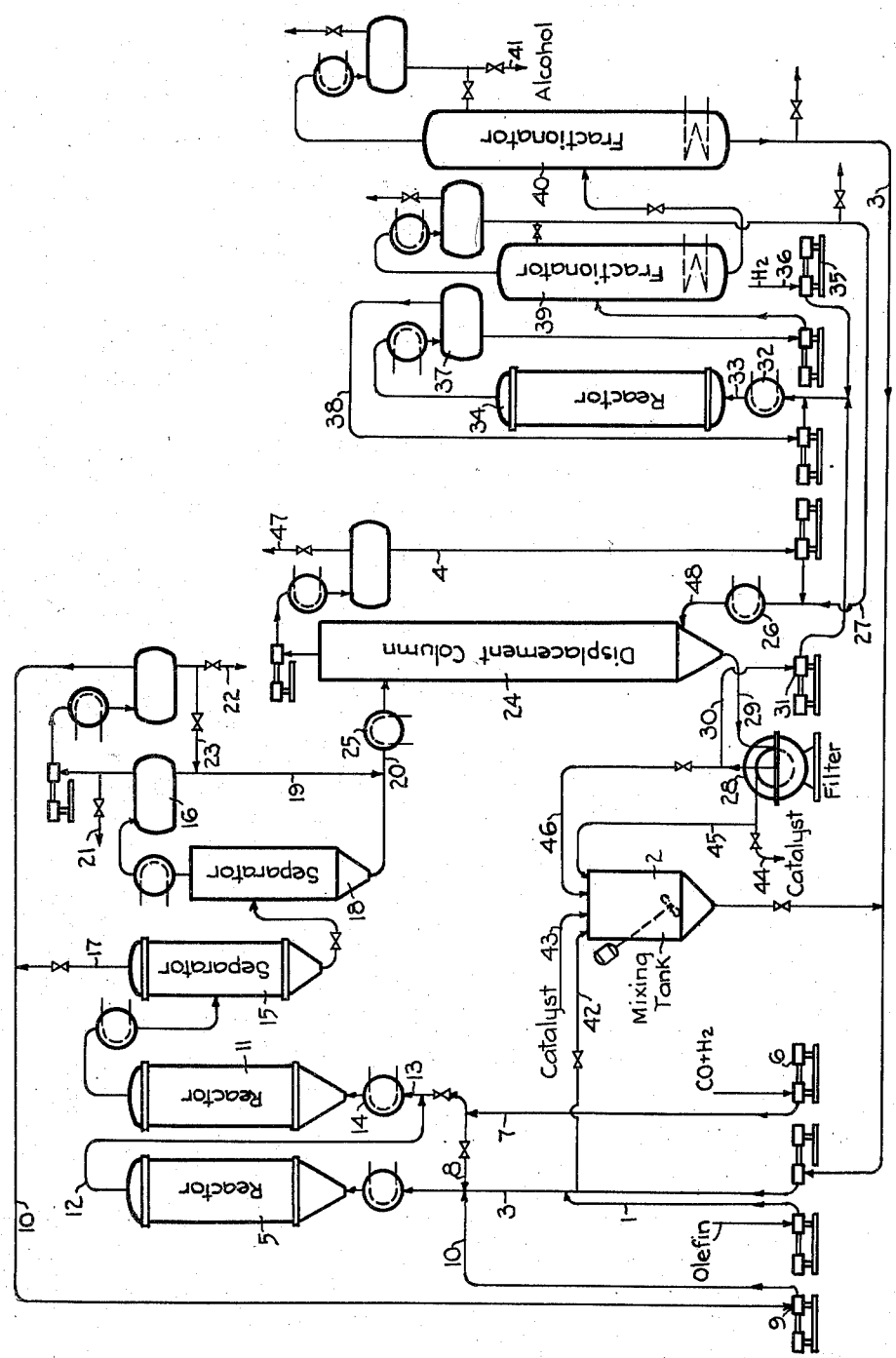
Fig. I

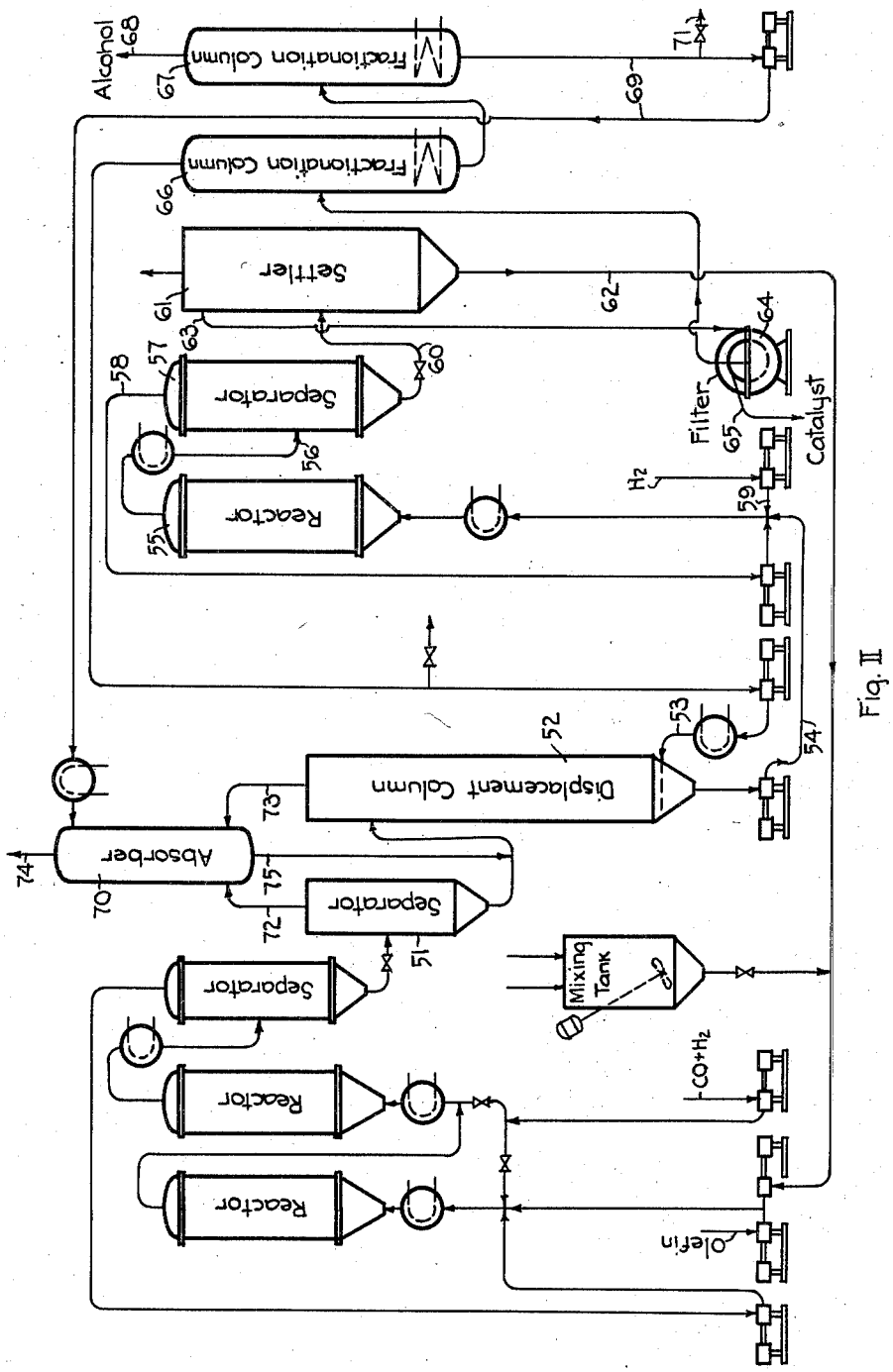
Fig. II

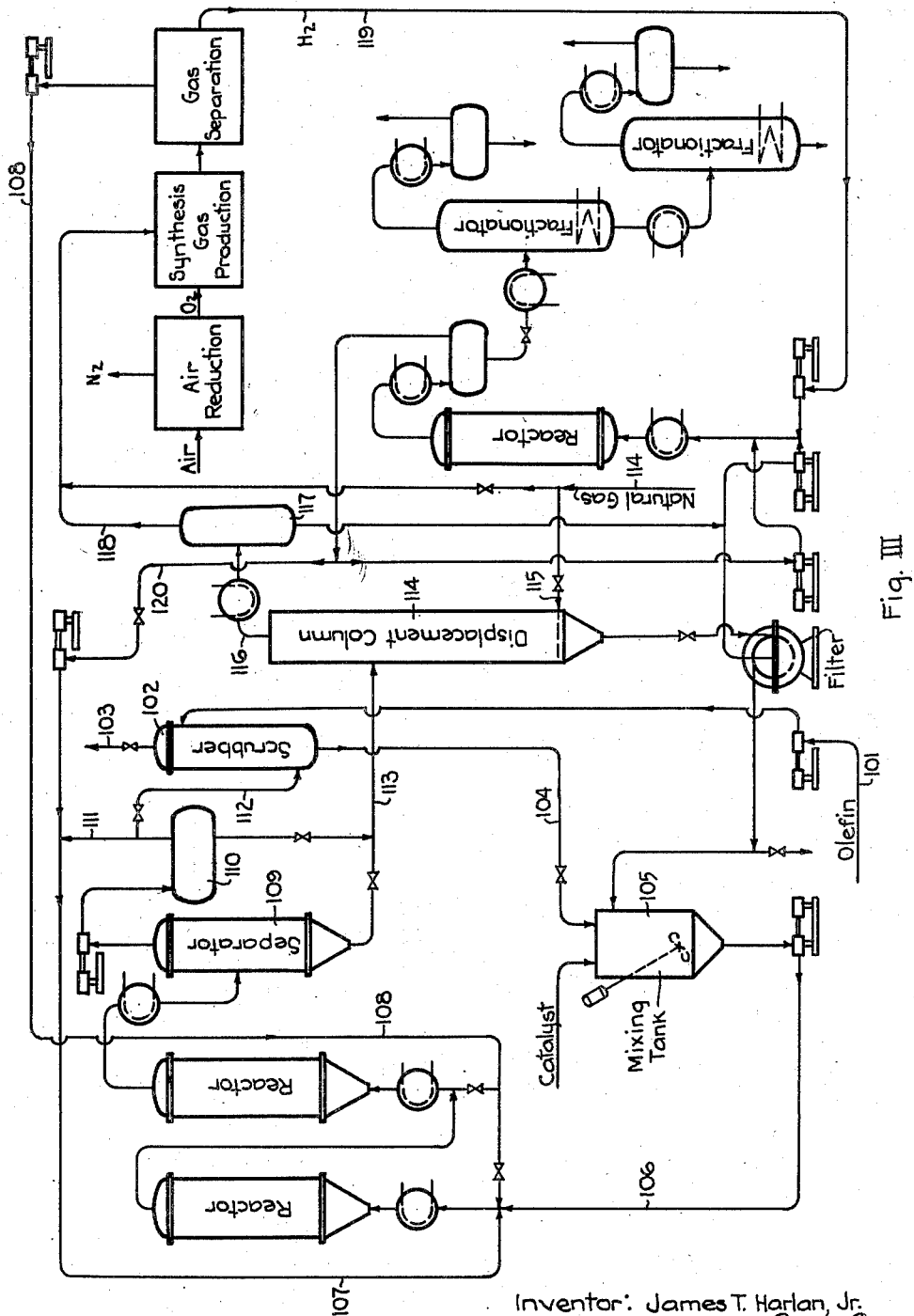

2,779,802

SYNTHESIS OF OXYGENATED COMPOUNDS

James T. Harlan, Jr., Houston, Tex., assignor to Shell Development Company, Emeryville, Calif., a corporation of Delaware Continuation of abandoned application Serial No. 709,312, November 12, 1946. This application May 18, 1953, Serial No. 355,589

9 Claims. (Cl. 260—638)

This invention relates to the production of oxygenated organic compounds through synthesis by a modification of the Oxo process.

The Oxo process provides a means for the synthesis of various oxygenated products through the addition of carbon monoxide and hydrogen to compounds containing a suitable linkage. The most important application of the Oxo process is in the production of carbinols by the addition of one molecule of carbon monoxide and two molecules of hydrogen to compounds containing an unsaturated bond, such as an olefin. The general reaction of this process may be written as follows:

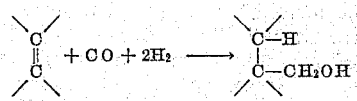

This reaction appears to take place in two steps, to wit:

(1) 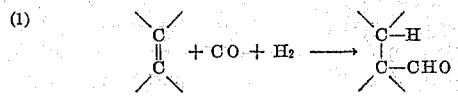

(2) 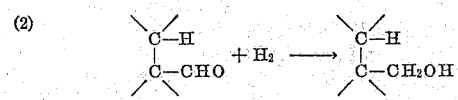

These reactions take place practically simultaneously and consequently a complete separation of the reactions is not possible. However, the reaction conditions conducive to the first reaction are not optimum for the second reaction. The process is therefore usually carried out in two steps. The primary reaction product is a mixture of the aldehyde and carbinol and the reaction is completed in the second (hydrogenation) step. The first or main step of the process is carried out at a temperature between about 80° C. and 200° C. and under a pressure above about 20 atmospheres in the presence of a Fischer-Tropsch catalyst. The reaction, it is seen, is carried out under a considerable partial pressure of carbon monoxide. Under these conditions a portion of the metal content of the catalyst is converted to the corresponding metal carbonyl. The metal carbonyl appears to have an important influence on the course of the reaction.

In the usual operation of the process, this metal carbonyl, being soluble in the reaction mixture, is passed with the reaction mixture from the first step. Under the strongly hydrogenating conditions in the second step the metal carbonyl is decomposed to carbon monoxide and the metal. This is undesirable since the carbon monoxide produced poisons the hydrogenating activity of the catalyst and leads to incomplete conversion. In order to avoid this difficulty it has been necessary to continuously remove carbon monoxide from the recycle gas in the second step by subjecting it to a so-called "methanization" treatment followed by considerable bleeding to prevent excessive dilution with methane. The so-called "methanization" consists in the catalytic conversion of the carbon monoxide to methane according to the equation:

$$CO + 3H_2 \rightarrow CH_4 + H_2O$$

In many cases, for instance where the reactants contain sulfur impurities, it is desirable to effect the second step of the process with a different, more sulfur-resistant catalyst. The presence of metal carbonyl in the feed to the second step in this case is also undesirable since it causes a loss of catalyst in the first step and the metal liberated from the carbonyl contaminates the catalyst in the second step.

The process described above is the conventional two-step Oxo process and will be referred to hereinafter as such.

The process of the invention relates to a modification of the Oxo process, wherein the metal carbonyl in the reaction product is decomposed and the liberated carbon monoxide is removed without consumption or loss of hydrogen. A more particular embodiment of the process of the invention relates to the synthesis of carbinols by a modification of the two-step Oxo process, wherein the detrimental effect of metal carbonyl in the reaction product in the second step is eliminated and the methanization treatment may be dispensed with. The desired decomposition of the metal carbonyl and the removal of the liberated carbon monoxide in the reaction product from the first synthesis step are effected according to the process of the invention by first subjecting the reaction product to a changed set of conditions of temperature or pressure, or both, at which the metal carbonyl tends to decompose and then forcing the decomposition to completion under the changed conditions by physical stripping of the liberated carbon monoxide from the liquid reaction mixture by means of a substantially inert gas or vapor.

According to a preferred embodiment of the invention, a normally gaseous hydrocarbon, preferably produced as a side product of the process, is utilized to effect decomposition of the metal carbonyl and displace the liberated carbon monoxide from the reaction product of the first synthesis step prior to subjecting it to the final synthesis step. While this is a preferred embodiment, the use of other substantially inert gases and/or vapors such as nitrogen, carbon dioxide, steam, and flue gas is within the purview of the invention.

Although the more important features which are believed to characterize the process of the invention have been mentioned above and are particularly pointed out in the claims appended hereto, the process may be better understood by referring to the following more detailed description in which specific illustrations of preferred embodiments are set forth. To assist in this description, reference is had to the attached drawings wherein there are shown by conventional figures simplified flow diagrams of typical applications of the process of the invention.

In the modifications illustrated in the drawings, a normally gaseous hydrocarbon is utilized to displace the liberated carbon monoxide from the reaction product of the first step. One suitable application of the process is in the production of butyl alcohol from a refinery so-called propane-propylene fraction. Another suitable application of the process is in the production of amyl alcohol from a refinery so-called butane-butylene fraction. Another suitable application is in the production of nonyl alcohols from butylene polymers. These applications will be used in describing the process.

The process illustrated in Figure I is a modification for the production of butyl alcohol using two catalysts. Referring to Figure I, the olefin, in this case a so-called propane-propylene fraction containing, for example, 60% propylene, is introduced via line 1 into line 3 wherein it is commingled with a slurry of the catalyst. A preferred catalyst is cobalt promoted by a minor amount of thorium oxide and supported upon a carrier such as kieselguhr. However, other Fischer-Tropsch type catalysts capable of forming metal carbonyl in the synthesis zone may be employed. Carbon monoxide and hydrogen (synthesis gas) in the proper ratio and amount are introduced to the stream by compressor 6 via lines 7 and 8. Recycle synthesis gas is also introduced into the stream by compressor 9 via line 10.

The conditions in reactor 5 are adjusted and maintained in the known manner to afford substantial synthesis. The reaction temperature may be from about 80° C. to about 200° C. for example, 150° C. The pressure may be from about 20 atmospheres up to several hundred atmospheres, for example 200 atmospheres. Under these conditions the reaction is carried out in the presence of a substantial liquid phase. The carbon monoxide and hydrogen in the feed to the reactor are preferably present in approximately equal molecular amounts and the total amount is preferably sufficient to agitate the liquid phase and maintain the catalyst in suspension. The amount of catalyst used may vary considerably but may be, for example, about 2%–4% based on the liquid phase. The residence time of the liquid in the reactor may vary depending upon the temperature, pressure, and activity of the catalyst, but is usually in the order of 10 minutes. The reaction is exothermic and some cooling is usually necessary to maintain the chosen temperature. This may be effected by cooling coils in the reactor (not shown).

For the purpose of obtaining a more complete reaction, the reaction mixture from reactor 5 is preferably, but not necessarily, passed to a second stage reactor operated at a somewhat higher temperature (for instance, 30° C. higher) than the first reactor. Thus, in the modification illustrated, the reaction product from reactor 5 is passed via lines 12 and 13 to reactor 11. The necessary heat may be supplied by heat exchanger 14. Additional synthesis gas approximately equivalent to the amount consumed in reactor 5 is introduced via lines 7 and 13.

The reaction mixture from reactor 11 is cooled somewhat and passed to a high pressure separator 15. Unreacted synthesis gas is passed via line 17 to line 10 and recycled. The liquid product from separator 15 is passed to a low temperature separator 18. Here, due to the drop in pressure, a considerable part of the propane is separated. This propane, it will be appreciated, is derived from side reactions (hydrogenation of propylene) as well as from the propane-propylene feed. The vaporization of the propane exerts a considerable cooling effect. Consequently, the temperature in separator 18 is below that in separator 15. The vapor phase product from separator 18, consisting of propane with minor amounts of aldehyde, alcohol and synthesis gas, is further cooled and passed to separator 16 to separate substantially all of the aldehyde and alcohol. The separated fraction is passed via line 19 and combined with the main reaction product in line 20. The uncondensed vapors from separator 16, now consisting essentially of propane and synthesis gas, may be withdrawn from the system via line 21, or they may be compressed and recooled to separate propane. In this latter case the separated synthesis gas is recycled via line 10 and the propane is withdrawn via line 22. In some cases it may be desirable to recombine some of the separated propane with the main reaction product. This may be done by means of bypass line 23.

The liquid product from separator 18 contains the catalyst in suspension and also contains dissolved carbon monoxide and dissolved metal carbonyl. For example, it may contain about 0.5 gram of cobalt as cobalt carbonyl per liter. In the absence of an appreciable partial pressure of carbon monoxide, the metal carbonyls are unstable and decompose at fairly low temperature. Cobalt carbonyl, for example, has a decomposition temperature of about 60° C. When under a high partial pressure of carbon monoxide, however, as in the first reaction zone, the metal carbonyl is stable up to considerably higher temperatures. For example, cobalt carbonyl is stable up to a temperature of about 130° C. when under a partial pressure of carbon monoxide of about 80 atmospheres. By merely reducing the pressure on the reaction product from the first step while maintaining the temperature above the decomposition temperature, the metal carbonyl is therefore caused to decompose. Merely reducing the total pressure is not sufficient, however, to cause the decomposition to proceed to completion at a sufficiently fast rate. In the process of the invention the rate of decomposition and the completeness of decomposition are improved by the described stripping or displacement action of the inert gas or vapor. This gas or vapor physically removes dissolved carbon monoxide according to the known laws. In the process of the invention the magnitude of the reduction in pressure is not critical since the stripping by the gas is effective in reducing the partial pressure of carbon monoxide in contact with the dissolved metal carbonyl. However, some reduction in pressure is desirable, and reduction to substantially atmospheric pressure, for instance, 1 to 3 atmospheres absolute, is preferred.

In accordance with the above explanations, the liquid product from separator 18 is passed via line 20 to displacement column 24 wherein the substantially complete decomposition of the metal carbonyl is effected. The temperature may be adjusted through control of the temperature of the materials charged. This may be accomplished by means of heat exchangers 25 and 26 and/or by means of external recirculation through heating coils (not shown). Typical conditions are, for example, a temperature between about 70° C. and 100° C. and substantially atmospheric pressure.

Displacement column 24 may be simply a long tubular column provided with a gas distributing plate near the bottom. It may be improved in efficiency however, by the proper use of baffles or vertical partitions dividing the column into a number of long narrow cells. Such modifications are well known to those skilled with the design of strippers and are not illustrated in the drawing.

As pointed out above, the gas utilized to displace or strip the liberated and dissolved carbon monoxide from the reaction mixture in this modification is propane. Thus, propane substantially free of carbon monoxide is introduced into displacement column 24 near the bottom via line 48.

The liquid product from displacement column 24 contains the catalyst in suspension as well as the suspended metal produced by decomposition of the metal carbonyl. In many cases it may be desired to pass this product directly to the second step of the process. However, the suspended catalyst is only a fair hydrogenation catalyst and is furthermore quite sensitive to poisoning by sulfur compounds. It is therefore desirable to employ a more active and less sulfur-sensitive catalyst in the last step. This is accomplished in this modification as follows:

The liquid product from the displacement column 24 is passed to a filter 28 via line 29. The filtrate substantially free of catalyst is then passed via line 30, pump 31, heater 32 and line 33 to a reactor 34. Hydrogen substantially free of carbon monoxide is introduced via pump 35 and line 36.

Reactor 34 is operated to provide the straightforward and simple hydrogenation of butyraldehyde. This may be effected with any one of a large number of known hydrogenation catalysts such as nickel sulfide, tungsten sulfide, copper chromite, and nickel. Merely by way of example one suitable set of conditions is to use a conventional supported nickel hydrogenation catalyst at a temperature of about 175° C. and at a pressure of about 125 p. s. i. g.

The reaction product is cooled and passed to separator

37. Unused hydrogen is recycled via line 38. The liquid reaction product is then passed to a fractionator 39 which is operated to separate propane from the higher boiling reaction products. This propane is passed to the displacement column as previously mentioned. The depropanized product is then passed to a fractionating column 40 which is operated to separate the butyl alcohol from higher boiling side reaction products. The alcohol is removed via line 41 and the higher boiling residue is removed via line 3. This higher boiling residue is utilized to introduce the catalyst into reactor 5 as a slurry. Thus, part of it may be passed by line 42 to mixing tank 2. Fresh catalyst is introduced via line 43. The partially spent catalyst separated from the reaction product by filter 28 is usually partially withdrawn via line 44 and the remainder passed to mixing tank 2 by line 45 and, hence, recycled. If desired, part of the reaction product may be passed to the mixing tank via line 46 to thin out the slurry.

The modification illustrated in Figure II differs from that illustrated in Figure I principally in that a single catalyst is used and the heavy fraction of the product is used to recover aldehyde and alcohol from the effluent by-product streams. In the modification illustrated in Figure II, the first step of the synthesis is carried out as described in connection with Figure I except that a refinery butane-butylene fraction is used in place of the propane-propylene fraction. The product after separating the recycle gas is passed to the low pressure separator 51. Here butane containing some metal carbonyl and some dissolved gas is separated. The liquid reaction product is then passed to the displacement column 52 wherein it is subjected to a stream of hot butane injected via line 53 while being held at a temperature which is above decomposition temperature of the metal carbonyl. The liquid product, now free of carbon monoxide and metal carbonyl and containing the catalyst in suspension, is passed via line 54 to hydrogenation reactor 55. The conditions in reactor 55 may be, for example, 190 atmospheres and 200° C. Hydrogen is supplied via line 59. The total reaction product is passed via line 56 to separator 57. Unreacted hydrogen is withdrawn via line 58, and recycled. The liquid product is then passed via line 60 to a settler 61. In settler 61 the bulk of the catalyst collects at the bottom and is withdrawn as a slurry via line 62 and recycled to the first stage of the synthesis. The liquid product still containing a small amount of suspended catalyst is withdrawn near the top via line 63 and passed to filter 64. Partially spent catalyst is withdrawn via line 65. The clarified liquid product is then passed to a series of two fractionating columns 66 and 67. In the first the butane is separated and removed overhead. This butane is cycled to the displacement column wherein it is used to decompose the metal carbonyl. In the second fractionating column the alcohol product, in this case amyl alcohol, is separated and removed overhead via line 68. The higher boiling residue is passed via line 69 to an absorber 70. Any excess beyond that required for this purpose may be withdrawn via line 71.

The vaporous products from separator 51 and displacement column 52 are passed to absorber 70 via lines 72 and 73, respectively. These vapors normally contain small to appreciable amounts of alcohol and aldehyde and usually also some metal carbonyl. By contacting these vapors with the higher boiling residue in absorber 70, these valuable products are recovered. The absorber liquid containing the absorbed aldehyde and alcohol and some of the butane is withdrawn from absorber 70 via line 75 and combined with the reaction product passing to displacement column 52. The excess butane is withdrawn with the carbon monoxide via line 74.

Figure III illustrates a further embodiment of the process of the invention which includes additional novel and advantageous features. In this modification, the Oxo process is in novel combination with the production of synthesis gas. The feeds to the plant are air, natural gas and olefin. The modification illustrated in this figure will be described in connection with the synthesis of high boiling alcohols using a high boiling olefin such as a polymer consisting largely of diisobutylene and triisobutylene. The olefin entering via line 101 is first utilized to scrub the exit gases from the first stage of the synthesis to recover product values therefrom. Thus the olefin feed is contacted with recycle gas from the first synthesis stage in scrubber 102. The scrubbed gas is discharged by line 103 and the olefin containing recovered material is then passed by line 104 to mixing tank 105 wherein it is slurried with the catalyst. The olefin containing the catalyst in suspension is passed to the first synthesis stage by line 106. Recycle synthesis gas is introduced by line 107. Fresh synthesis gas is introduced by line 108. The first synthesis stage is carried out in a manner analogous to that described in connection with the other figures. Recycle gas from the first synthesis stage is separated from the bulk of the reaction product in separators 109 and 110 and passed via line 111 to recycle line 107. A part of the gas is withdrawn by line 112 and passed to scrubber 102.

The liquid reaction product containing dissolved carbon monoxide and metal carbonyl and containing catalyst in suspension is passed by line 113 to the displacement column 114 wherein decomposition of the metal carbonyl is effected and the carbon monoxide is stripped as previously described. In this modification this is effected using natural gas. Thus natural gas for the plant enters via line 114′, and is passed to the distributor of the displacement column by line 115. The natural gas containing carbon monoxide and some product values is withdrawn from the displacement column by line 116. After recovering product values in separator 117 the natural gas containing carbon monoxide is passed by line 118 to the synthesis gas production step. Air is first separated into oxygen and nitrogen in a conventional air reduction step. The oxygen is then reacted with the natural gas to produce synthesis gas. The synthesis gas normally contains hydrogen and carbon monoxide in a ratio of about 2:1. While this is about the correct ratio theoretically required for synthesis of carbinols, it is not the optimum ratio for use in the first stage of the synthesis. The synthesis gas is therefore separated into a hydrogen fraction and a fraction containing the carbon monoxide in a gas separation step. The separation may be effected through the so-called water gas shift reaction or in any other desired manner. The hydrogen is passed by line 119 to the second synthesis stage which is carried out as described in connection with Figure I. The carbon monoxide fraction of the synthesis gas is passed by line 108 to the first synthesis stage. Hydrogen to provide the desired ratio of hydrogen to carbon monoxide in the first synthesis stage is provided by withdrawing the necessary amount of recycle gas from the second synthesis stage and passing it to the first synthesis stage. Line 120 is provided for this purpose.

The most important technical application of the process of the invention is in the production of saturated primary alcohols from aliphatic olefins having between 2 and about 20 carbon atoms. In this application any of the aliphatic olefins may be used. Thus the olefin may be a primary, secondary or tertiary olefin or mixture thereof. The olefin does not necessarily have to be pure but may contain small amounts of sulfur compounds, nitrogen compounds or other normal impurities. Also inert diluent materials such as aromatic or saturated hydrocarbons, alcohols, ketones, organic acids, ethers and steam may be present. Very suitable sources of olefins are the various olefin polymer fractions obtained by the polymerization of lower olefins and olefinic products of cracking, dehydrogenation and related processes.

An important application of the process is the production of higher alcohols (for instance having from about 9 to about 17 carbon atoms) as intermediates in the production of detergents and related products. For this purpose alcohols having relatively straight chains are preferred. Since the olefins produced by the cracking of petroleum wax and those produced by the polymerization of ethylene are predominantly straight chain olefins, these olefinic products are particularly suitable feeds.

While the process is at present primarily of importance for the production of open chain monohydric alcohols, the process is also applicable for the production of carbinols having aromatic and cycloparaffin groups, as by the application of such olefinic materials as cyclohexene, cyclopentene, cyclohexylethylene, styrene and the like. Also it may be applied for the production of polyhydric carbinols from materials containing two or more ethylenic bonds such as butadiene, cyclohexadiene, etc. Hydrocarbons having one or more acetylenic linkages may also be applied.

While unsaturated hydrocarbons are by far the cheapest raw materials and are of primary interest, at present the process is not limited to the use of these materials. Thus, various oxygenated compounds containing an unsaturated bond such as unsaturated aldehydes, ketones, acids, esters, alcohols and ethers may be employed. Carbon monoxide and hydrogen add to the unsaturated bond in such compounds in a similar manner. Thus, from an unsaturated aldehyde or alcohol a saturated dihydric alcohol is produced, and from unsaturated ketones, acids, esters and ethers the corresponding carbinol addition products are formed.

This application is a continuation of application Serial Number 709,312, filed November 12, 1946, now abandoned, which application is a continuation-in-part of application Serial Number 689,377, filed August 9, 1946, now abandoned.

I claim as my invention:

1. In the synthesis of a carbinol having from about 9 to about 17 carbon atoms by the two-step Oxo process, the improvement which comprises passing a substantially inert vapor up through the liquid intermediate aldehydic reaction product containing dissolved cobalt while maintaining said reaction product at a temperature below the synthesis temperature but above 60° C. for a time to produce a reaction product substantially free of dissolved cobalt and carbon monoxide formed upon decomposition of the soluble cobalt compounds.

2. In the synthesis of an oxygenated compound having from about 9 to about 17 carbon atoms by the two-step Oxo process, the improvement which comprises passing vapors of methane up through the liquid intermediate aldehydic reaction product containing dissolved cobalt while maintaining said reaction product at a temperature below the synthesis temperature but between about 70° C. and 100° C. for a time to produce a reaction product substantially free of dissolved cobalt and carobn monoxide formed upon decomposition of the dissolved cobalt compounds and reacting the methane after passing up through said reaction product with oxygen to form synthesis gas used in said Oxo process.

3. In the production of a carbinol having from about 9 to about 17 carbon atoms by the two-step Oxo process, the improvement which comprises stripping the reaction product of the first step containing dissolved cobalt of carbon monoxide prior to subjecting it to the second step by bubbling therethrough vapors of a saturated hydrocarbon by-product of the process while maintaining said reaction product at a temperature below the synthesis temperature but between about 70° C. and 100° C. and at a pressure below the reaction pressure in the first step.

4. In the production of a carbinol having from about 9 to about 17 carbon atoms by the two-step Oxo process, the improvement which comprises stripping the reaction product of the first step containing dissolved cobalt of carbon monoxide prior to subjecting it to the second step by bubbling therethrough a substantially inert vapor while maintaining said reaction product at a temperature below the synthesis temperature but between about 70° C. and 100° C. and at a pressure below the reaction pressure in the first step, thereby to effect substantially complete decomposition of the soluble cobalt compounds.

5. In the production of a carbinol having from about 7 to about 17 carbon atoms by the two-step Oxo process, the improvement which comprises stripping the reaction product of the first step containing dissolved cobalt of carbon monoxide prior to subjecting it to the second step by bubbling therethrough a substantially inert vapor while maintaining said reaction product at a temperature below the synthesis temperature but between about 70° C and 100° C. and at substantially atmospheric pressure, for a time sufficient to effect substantially complete decomposition of the soluble cobalt compounds thereby to free the said reaction product of said dissolved cobalt.

6. In the synthesis of an alcohol having from about 9 to about 17 carbon atoms by the two-step Oxo process, the improvement which comprises cooling the liquid aldehydic reaction product of the first synthesis step to a temperature below the synthesis temperature in said first step but above 70° C., passing the cooled reaction product downwardly countercurrent to an ascending stream of substantially inert gas under a pressure below the synthesis pressure in said first step, thereby to effect substantially complete decomposition of dissolved cobalt compounds to metallic cobalt, and separately recovering vaporized reaction product from said substantially inert gas.

7. In the synthesis reaction for the preparation of oxygenated compounds wherein olefins, carbon monoxide and hydrogen are reacted in the presence of a cobalt catalyst under conditions which produce oxygenated synthesis products contaminated with dissolved cobalt carbonyl, the method of freeing the synthesis products of such cobalt carbonyl which comprises, treating said contaminated synthesis products, under non-reducing conditions and under conditions causing decomposition of cobalt carbonyl accompanied by consequent liberation of carbon monoxide, with an inert gas to remove carbon monoxide therefrom, and removing the effluent gases.

8. In the process of removing dissolved cobalt carbonyl from the liquid oxygenated product of the conversion of organic compounds having an olefinic double bond with CO and $H_2$ in the presence of carbonyl-forming cobalt catalysts, said liquid oxygenated product comprising substantial amounts of aldehydes, by heating said liquid product in a catalyst decomposition zone under catalyst decomposition conditions including elevated temperatures, the improvement which comprises maintaining decomposition temperature by mixing said product in said catalyst decomposition zone with a fluid sufficient in amount and preheated in the absence of dissolved cobalt carbonyl to a temperature sufficient to keep the mixture formed at said decomposition temperature.

9. The process of claim 8 in which said fluid is a gas.

References Cited in the file of this patent

UNITED STATES PATENTS 2,596,920     Smith et al. _____ May 13, 1952